(12) United States Patent
Bordwell et al.

(10) Patent No.: US 8,069,741 B2
(45) Date of Patent: Dec. 6, 2011

(54) MODULAR SPLIT SHAFT TRANSFER CASE

(75) Inventors: Mark A. Bordwell, Olive Branch, MS (US); William J. Douglass, Bartlett, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 1003 days.

(21) Appl. No.: 11/731,635

(22) Filed: Mar. 30, 2007

(65) Prior Publication Data

US 2007/0227296 A1    Oct. 4, 2007

Related U.S. Application Data

(60) Provisional application No. 60/788,480, filed on Mar. 31, 2006.

(51) Int. Cl.
*F16H 37/00* (2006.01)
*F16H 3/08* (2006.01)

(52) U.S. Cl. ............................. 74/15.86; 74/15.2; 74/333

(58) Field of Classification Search ............. 74/11, 15.2, 74/15.69, 15.82, 15.86, 333, 335, 339
See application file for complete search history.

(56) References Cited

U.S. PATENT DOCUMENTS

| | | | | |
|---|---|---|---|---|
| 1,559,617 A * | 11/1925 | Johnston | ...................... | 180/291 |
| 2,081,846 A | 5/1937 | Behrens | | |
| 2,163,507 A * | 6/1939 | Wolchek | ..................... | 74/473.1 |
| 2,179,171 A * | 11/1939 | Boho | ........................ | 74/665 GA |
| 4,020,715 A | 5/1977 | Sollars | | |
| 4,811,804 A * | 3/1989 | Ewers et al. | .................. | 180/53.8 |
| 5,207,121 A | 5/1993 | Bien | | |
| 5,275,253 A * | 1/1994 | Sperduti et al. | ............... | 180/197 |
| 5,363,938 A | 11/1994 | Wilson et al. | | |
| 5,380,255 A * | 1/1995 | Brissenden et al. | .......... | 475/204 |
| 5,655,618 A | 8/1997 | Wilson et al. | | |
| 5,688,202 A | 11/1997 | Bowen | | |
| 5,697,861 A | 12/1997 | Wilson | | |
| 5,702,321 A | 12/1997 | Bakowski et al. | | |
| 5,826,460 A | 10/1998 | Soncina et al. | | |
| 6,053,072 A | 4/2000 | Schleuder | | |
| 6,272,941 B1 | 8/2001 | Phillips | | |

(Continued)

OTHER PUBLICATIONS

Parts List 2230 Series, Bulletin HY25-2130-M1/US dated Feb. 9, 2009.

*Primary Examiner* — Justin Krause
*Assistant Examiner* — Adam D Rogers
(74) *Attorney, Agent, or Firm* — MacMillan, Sobanski & Todd, LLC

(57) ABSTRACT

A split shaft transfer case includes a first housing portion and a second housing portion that are secured together along a plane of engagement to form an enclosure. An input shaft and an output shaft that are each supported for rotation about an axis of rotation that is generally parallel to the plane of engagement defined by the first and second housing portions. A first operating shaft is supported for rotation about an axis of rotation, and a first operating clutch selectively connects the first operating shaft to the input shaft for rotation therewith. A second operating shaft supported for rotation about an axis of rotation, and a second operating clutch selectively connects the second operating shaft to the input shaft for rotation therewith. The axis of rotation of at least one of the first and second operating shafts is movable relative to the axis of rotation of the input and output shafts.

13 Claims, 6 Drawing Sheets

U.S. PATENT DOCUMENTS

| | | |
|---|---|---|
| 6,393,944 B1 | 5/2002 | Soncina et al. |
| 6,595,338 B2 | 7/2003 | Bansbach et al. |
| 6,840,880 B2 | 1/2005 | Glassner |
| 6,848,550 B2 | 2/2005 | Puiu |
| 2008/0141800 A1* | 6/2008 | Seitz et al. .................. 74/15.82 |

* cited by examiner

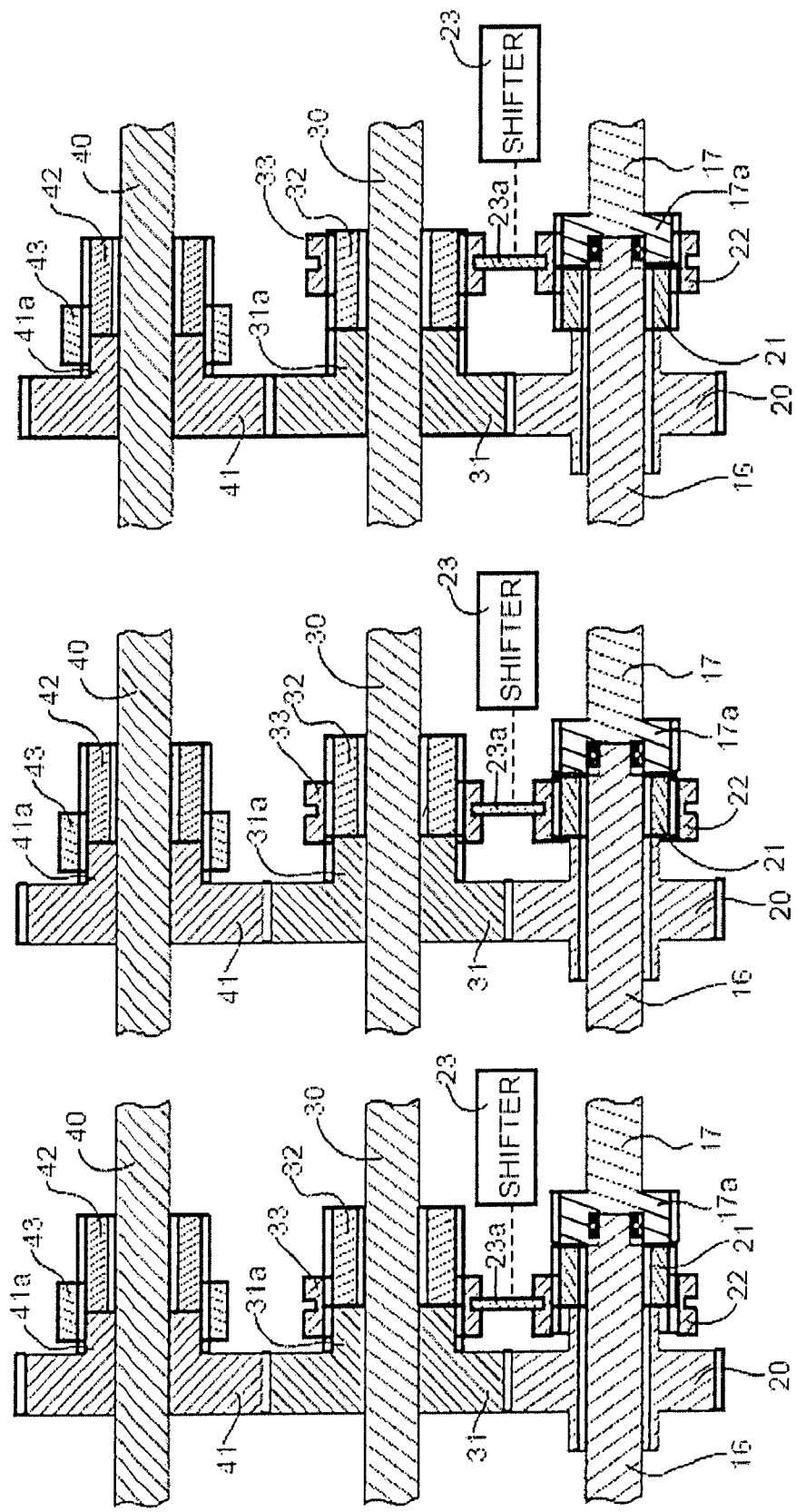

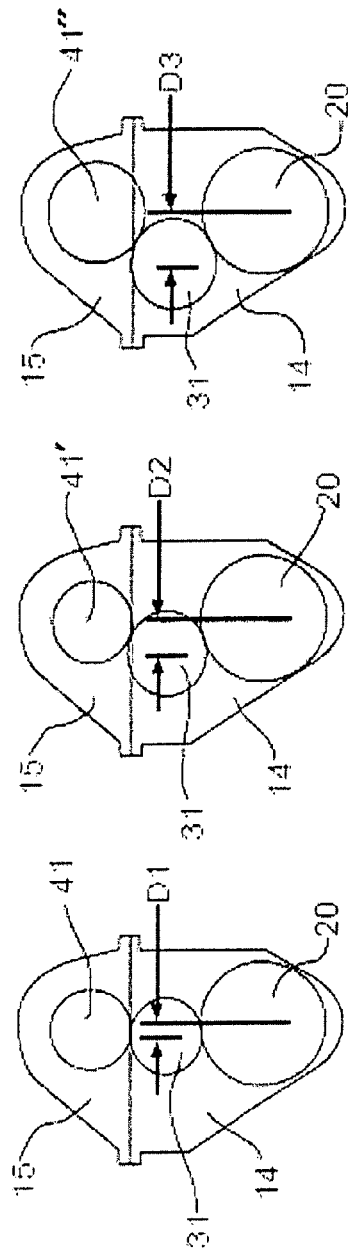
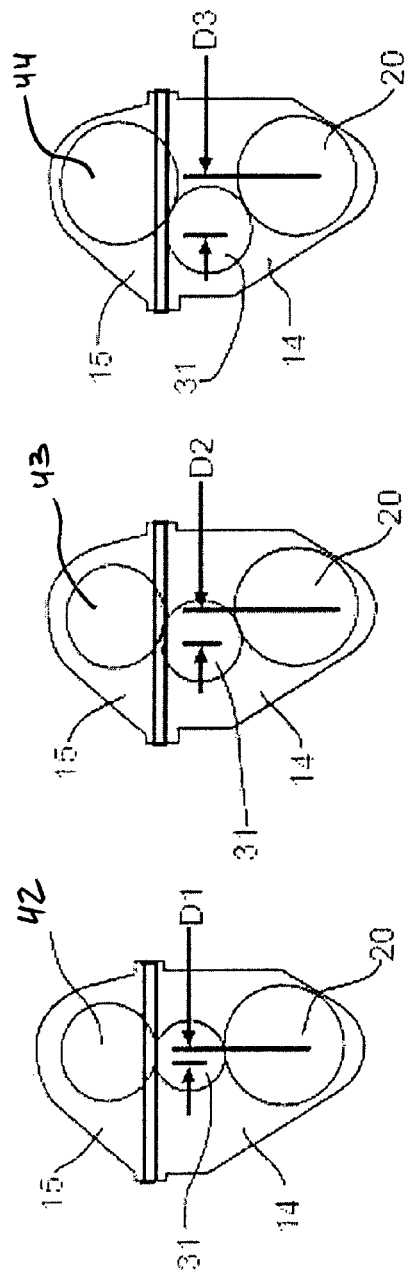

MODULAR SPLIT SHAFT TRANSFER CASE

CROSS-REFERENCE TO RELATED APPLICATIONS

This application claims the benefit of U.S. Provisional Application No. 60/788,480, filed Mar. 31, 2006, the disclosure of which is incorporated herein by reference.

BACKGROUND OF THE INVENTION

This invention relates in general to a split shaft transfer case for selectively connecting a source of rotational power to a rotatably driven mechanism in a drive train system. In particular, this invention relates to an improved structure for such a split shaft transfer case that facilitates the installation and use of one or more power take-offs.

Drive train systems are widely used for generating rotational power from a source and for transferring such rotational power from the source to a rotatably driven mechanism. For example, in most land vehicles in use today, an engine/transmission assembly generates rotational power, and such rotational power is transferred from the engine/transmission assembly through a driveshaft assembly to an axle assembly so as to rotatably drive the wheels of the vehicle. In some of such land vehicles, a split shaft transfer case is provided in the drive train system for selectively connecting the engine/transmission assembly to the axle assembly for intermittent operation. When the split shaft transfer case is engaged, the engine/transmission assembly is connected to (and, therefore, rotatably drives) the axle assembly and the wheels of the vehicle. When the split shaft transfer case is disengaged, the engine/transmission assembly is disconnected from (and, therefore, does not rotatably drive) the axle assembly and the wheels of the vehicle.

Split shaft transfer cases are frequently provided on trucks and other specialty application vehicles having one or more accessories provided thereon that perform desired functions. Generally, the split shaft transfer case is engaged when it is desired to move the vehicle from one location to another and disengaged when it is desired to stop the vehicle and operate the accessories at a particular location. For example, a concrete pumping truck may be provided with a variety of linear and rotary actuators for mixing and dispensing concrete. The split shaft transfer case is initially engaged to move the concrete pumping truck to a desired location. Then, the split shaft transfer case is disengaged to operate the linear and rotary actuators to mix and dispense the concrete without moving the concrete pumping truck from that desired location.

In many instances, the accessories that are provided on the vehicle (such as, for example, the linear and rotary actuators that may be provided on the above-described concrete pumping truck) are operated when supplied with pressurized hydraulic or pneumatic fluid. In order to supply such pressurized hydraulic or pneumatic fluid to the accessories, it is known to provide one or more hydraulic or pneumatic pumps on the vehicle. The pumps selectively supply pressurized fluid to the accessories when operation thereof is desired. To accomplish this, one or more power take-offs may be provided on a portion of the drive train system. Power take-offs are well known mechanical devices that are, for example, commonly connected to sources of rotational power (such as engines, transmissions, and split shaft transfer cases in a drive train system) to selectively provide mechanical rotational power to rotatably driven accessories. Thus, in a drive train system that includes a split shaft transfer case, it is known to connect one or more power take-offs on the split shaft transfer case to selectively operate accessories that are provided on the vehicle.

Although power take-offs have been used effectively in conjunction with split shaft transfer cases in the past, it has been found that in some instances, it is relatively difficult and time consuming to install the power take-off assemblies on the split shaft transfer cases. Such installation difficulties can be caused by a limited amount of physical space between the split shaft transfer case and other components of the vehicle, such as the side rails of the vehicle frame. Such installation difficulties can also be caused by a lack of axial alignment between an output structure of the power take-off and an input structure of the rotatably drive accessory. Thus, it would be desirable to provide an improved structure for a split shaft transfer case that facilitates the installation and use of one or more power take-offs.

SUMMARY OF THE INVENTION

This invention relates to an improved structure for a split shaft transfer case that facilitates the installation and use of one or more power take-offs. The split shaft transfer case includes a first housing portion and a second housing portion that are secured together along a plane of engagement to form an enclosure. An input shaft and an output shaft that are each supported for rotation about an axis of rotation that is generally parallel to the plane of engagement defined by the first and second housing portions. A first operating shaft is supported for rotation about an axis of rotation, and a first operating clutch selectively connects the first operating shaft to the input shaft for rotation therewith. A second operating shaft supported for rotation about an axis of rotation, and a second operating clutch selectively connects the second operating shaft to the input shaft for rotation therewith. The axis of rotation of at least one of the first and second operating shafts is movable relative to the axis of rotation of the input and output shafts.

Various objects and advantages of this invention will become apparent to those skilled in the art from the following detailed description of the preferred embodiments, when read in light of the accompanying drawings.

BRIEF DESCRIPTION OF THE DRAWINGS

FIG. 2 is a schematic side elevational view of a portion of an internal gear train for the first embodiment of the split shaft transfer case illustrated in FIG. 1, wherein the internal gear train is shown in a first operating mode.

FIG. 3 is a schematic side elevational view of the portion of the internal gear train illustrated in FIG. 2 shown in a second operating mode.

FIG. 4 is a schematic side elevational view of the portion of the internal gear train illustrated in FIGS. 2 and 3 shown in a third operating mode.

FIGS. 10 through 15 illustrate a variety of configurations for the first embodiment of the split shaft transfer case that can be achieved using the different bearing support plates illustrated in FIGS. 7, 8, and 9 and a spacer provided between the first housing portion and the second housing portion.

DETAILED DESCRIPTION OF THE PREFERRED EMBODIMENTS

Figure 1:
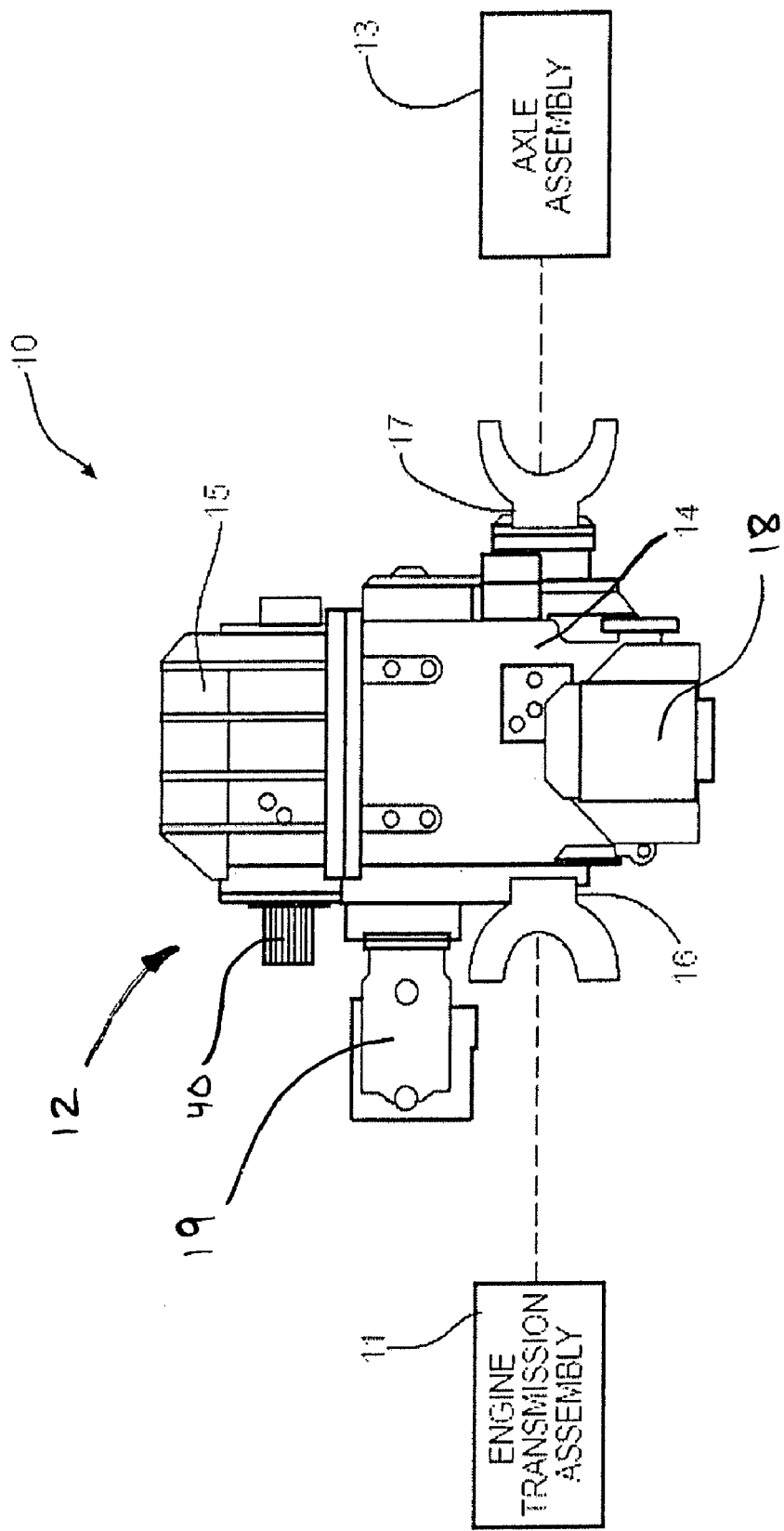
FIG. 1 is a side elevational view of a drive train system including a first embodiment of a split shaft transfer case in accordance with this invention.

Referring now to the drawings, there is illustrated in FIG. 1 a schematic side elevational view of a drive train system, indicated generally at 10, in accordance with this invention. The illustrated drive train system 10 is intended merely to illustrate one environment in which this invention may be used. Thus, the scope of this invention is not intended to be limited for use with the specific structure for the drive train system 10 illustrated in FIG. 1 or with drive train systems in general. On the contrary, as will become apparent below, this invention may be used in any desired environment for the purposes described below.

The illustrated drive train system 10 includes a source of rotational energy. In the illustrated embodiment, the source of rotational energy is a conventional engine/transmission assembly 11. The engine/transmission assembly 11 generates rotational power in a conventional manner, and such rotational power is transferred from the engine/transmission assembly 11 through a split shaft transfer case, indicated generally at 12, to an axle assembly 13 so as to rotatably drive one or more wheels (not shown) of the vehicle. As is well known in the art, the split shaft transfer case 12 is provided for, among other things, selectively connecting the engine/transmission assembly 11 to the axle assembly 13 for intermittent operation. When the split shaft transfer case 12 is engaged, the engine/transmission assembly 11 is connected to (and, therefore, rotatably drives) the axle assembly 13 and the wheels of the vehicle. When the split shaft transfer case 12 is disengaged, the engine/transmission assembly 11 is disconnected from (and, therefore, does not rotatably drive) the axle assembly 13 and the wheels of the vehicle.

The split shaft transfer case 12 includes a first housing portion 14 and a second housing portion 15 that are secured together in any conventional manner to form an enclosure for supporting and protectively enclosing the various components thereof. The first housing portion 14 and the second housing portion 15 preferably engage one another along a generally flat plane of engagement, the purpose of which will be explained below. An input shaft 16 of the illustrated split shaft transfer case 12 is rotatably supported on the first housing portion 14 and is connected to an output shaft (not shown) of the engine/transmission assembly 11. Similarly, an output shaft 17 of the illustrated split shaft transfer case 12 is rotatably supported on the first housing portion 14 and is connected to an input shaft (not shown) of the axle assembly 13. The input shaft 16 and the output shaft 17 of the split shaft transfer case 12 define respective axes of rotation that are preferably parallel to one another and, as shown in the illustrated embodiment, are more preferably co-axially aligned, although such is not required. The plane of engagement defined by the engaging surfaces of the first housing portion 14 and the second housing portion 15 is preferably parallel to the axes of rotation of the input shaft 16 and the output shaft 17, although again such is not required. Such an arrangement is desirable because it reduces the surface area of engagement between the first housing portion 14 and the second housing portion 15 and, as a result, minimizes sealing and securement issues therebetween.

The split shaft transfer case 12 can support and rotatably drive a plurality of driven devices. For example, one or more conventional power take-offs 18 (only one is illustrated) may be supported on the first housing portion 14 of the split shaft transfer case 12. The power take-offs 18 are conventional in the art and can each be secured to the first housing portion 14 using threaded fasteners (not shown) or any other desired means. Each of the power take-offs 18 includes an input gear (not shown) that extends through an opening formed through the first housing portion 14 into engagement with a rotatably driven structure (such as described in detail below) provided within the split shaft transfer case 12. As a result, each of the power take-offs 18 can provide mechanical rotational power to a rotatably driven accessory (not shown). Additionally, an accessory 19 may be directly supported on the first housing portion 14 of the split shaft transfer case 12. The accessory 19 is also conventional in the art and can also be secured to the first housing portion 14 using threaded fasteners (not shown) or any other desired means. In the illustrated embodiment, the accessory 19 cooperates with a rotatably driven structure (such as described in detail below) so as to be rotatably driven thereby. Other driven devices (not shown) may be supported on the first housing portion 14 of the split shaft transfer case 12 so as to be rotatably driven in a similar manner.

The salient components of the split shaft transfer case 12 are schematically illustrated in FIGS. 2, 3, and 4. As shown therein, the input shaft 16 of the split shaft transfer case 12 supports a drive gear 20 for rotation therewith. In the illustrated embodiment, the drive gear 20 is splined onto the input shaft 16 for concurrent rotation. The input gears of the power take-offs 18 described above may extend into engagement with the drive gear 20 so as to be rotatably driven thereby. The drive gear 20 includes an outer circumferential surface having a plurality of conventional gear teeth provided thereon for a purpose that will be explained below. Additionally, the input shaft 16 of the split shaft transfer case 12 supports a drive clutch gear 21 for rotation therewith. In the illustrated embodiment, the drive clutch gear 21 is splined onto the input shaft 16 for concurrent rotation. The drive clutch gear 21 includes an outer circumferential surface having a plurality of conventional splines provided thereon for a purpose that will also be explained below. Lastly, the output shaft 17 of the split shaft transfer case 12 includes an end portion 17a having an outer circumferential surface that is provided with a plurality of conventional splines for a purpose that will also be explained below.

A drive clutch collar 22 is supported on the drive clutch gear 21 for rotation therewith. In the illustrated embodiment, the drive clutch collar 22 includes an inner circumferential surface having a plurality of conventional splines provided thereon that continuously cooperate with the splines provided on the outer circumferential surface of the drive clutch gear 21 and that selectively cooperate with the splines provided on the outer circumferential surface of the end portion 17a of the output shaft 17. The drive clutch collar 22 is axially slidable between a non-engaged position (illustrated in FIGS. 2 and 3) and an engaged position (illustrated in FIG. 4). In the non-engaged position, the splines of the drive clutch collar 22 engage only the splines of the drive clutch gear 21 and do not engage the splines provided on the end portion 17*a* of the output shaft. Thus, when the drive clutch collar 22 is in the non-engaged position, the output shaft 17 is not rotatably driven by the input shaft 16. In the engaged position, the splines of the drive clutch collar 22 engage both the splines of the drive clutch gear 21 and the splines provided on the end portion 17*a* of the output shaft. Thus, when the drive clutch collar 22 is in the engaged position, the output shaft 17 is rotatably driven by the input shaft 16.

A first shifter 23 is provided for selectively moving the drive clutch collar 22 between the non-engaged and engaged positions. The first shifter 23 may be embodied as any conventional actuator for causing axial movement of the drive clutch collar 22 as shown in FIGS. 2, 3, and 4. For example, the first shifter 23 may be embodied as a conventional pneumatic actuator. The first shifter 23 may be connected to the drive clutch collar 23 by a shift fork 23*a*. Thus, actuation of the first shifter 23 causes axial movement of the shift fork 23*a* and the drive clutch collar 22 between the non-engaged and engaged positions described above.

The split shaft transfer case 12 also includes a first operating shaft 30 that is rotatably supported on the first housing portion 14 thereof in an adjustable manner. The specific manner in which the first operating shaft 30 is adjustably supported on the first housing portion 14 of the split shaft transfer case 12 will be explained below. The first operating shaft 30 of the split shaft transfer case 12 supports a first operating gear 31 for rotation relative thereto. The first operating gear 31 includes an outer circumferential surface having a plurality of conventional gear teeth provided thereon that cooperate with the gear teeth provided on the outer circumferential surface of the drive gear 20. Thus, when the input shaft 16 is rotated, the drive gear 20 and the first operating gear 31 are also rotated. The first operating gear 31 also includes a secondary gear portion 31*a* that, in the illustrated embodiment, is formed integrally with the first operating gear 31, although such is not required. The secondary gear portion 31*a* includes an outer circumferential surface having a plurality of conventional splines provided thereon. Additionally, the first operating shaft 30 of the split shaft transfer case 12 supports a first operating clutch gear 32 for rotation therewith. In the illustrated embodiment, the first operating clutch gear 32 is splined onto the first operating shaft 30 for concurrent rotation. The first operating clutch gear 32 includes an outer circumferential surface having a plurality of conventional splines provided thereon.

A first operating clutch collar 33 is supported on the first operating clutch gear 32 for rotation therewith. In the illustrated embodiment, the first operating clutch collar 33 includes an inner circumferential surface having a plurality of conventional splines provided thereon that continuously cooperate with the splines provided on the outer circumferential surface of the first operating clutch gear 32 and that selectively cooperate with the splines provided on the outer circumferential surface of the secondary gear portion 31*a* of the first operating gear 31. The first operating clutch collar 33 is axially slidable between a non-engaged position (illustrated in FIGS. 3 and 4) and an engaged position (illustrated in FIG. 2). In the non-engaged position, the splines of the first operating clutch collar 33 engage only the splines of the first operating clutch gear 32 and do not engage the splines of the secondary gear portion 31*a* of the first operating gear 31. Thus, when the first operating clutch collar 33 is in the non-engaged position, the first operating shaft 30 is not rotatably driven by the input shaft 16. In the engaged position, the splines of the first operating clutch collar 33 engage both the splines of the first operating clutch gear 32 and the splines of the secondary gear portion 31*a* of the first operating gear 31. Thus, when the first operating clutch collar 33 is in the engaged position, the first operating shaft 30 is rotatably driven by the input shaft 16. The accessory 19 described above may cooperate with the first operating shaft 30 so as to be rotatably driven thereby.

The first shifter 23 is also provided for selectively moving the first operating clutch collar 33 between the non-engaged and engaged positions. To accomplish this, the first shifter 23 may be connected to the first operating clutch collar 33 by the shift fork 23*a*. Thus, actuation of the first shifter 23 in the manner described above causes axial movement of the shift fork 23*a* and the first operating clutch collar 33. As shown in FIGS. 2, 3, and 4, the split shaft transfer case 12 is operable in three different modes of operation. In the first mode of operation illustrated in FIG. 2, the drive clutch collar 22 is in the non-engaged position and the first operating clutch collar 33 is in the engaged position. Thus, as described above, the output shaft 17 is not rotatably driven by the input shaft 16, and the first operating shaft 30 is rotatably driven by the input shaft 16. In the second mode of operation illustrated in FIG. 3, the drive clutch collar 22 is in the non-engaged position and the first operating clutch collar 33 is in the non-engaged position. Thus, as described above, the output shaft 17 is not rotatably driven by the input shaft 16, and the first operating shaft 30 is not rotatably driven by the input shaft 16. In the third mode of operation illustrated in FIG. 4, the drive clutch collar 22 is in the engaged position and the first operating clutch collar 33 is in the non-engaged position. Thus, as described above, the output shaft 17 is rotatably driven by the input shaft 16, and the first operating shaft 30 is not rotatably driven by the input shaft 16. The purpose for these three modes of operation will be described below.

The split shaft transfer case 12 further includes a second operating shaft 40 that is rotatably supported on the second housing portion 15 thereof in any conventional manner. The second operating shaft 40 of the split shaft transfer case 12 supports a second operating gear 41 for rotation relative thereto. The second operating gear 41 includes an outer circumferential surface having a plurality of conventional gear teeth provided thereon that cooperate with the gear teeth provided on the outer circumferential surface of the first operating gear 31. Thus, when the input shaft 16 is rotated, the drive gear 20, the first operating gear 31, and the second operating gear 41 are also rotated. The second operating gear 41 also includes a secondary gear portion 41*a* that, in the illustrated embodiment, is formed integrally with the second operating gear 41, although such is not required. The secondary gear portion 41*a* includes an outer circumferential surface having a plurality of conventional splines provided thereon. Additionally, the second operating shaft 40 of the split shaft transfer case 12 supports a second operating clutch gear 42 for rotation therewith. In the illustrated embodiment, the second operating clutch gear 42 is splined onto the second operating shaft 40 for concurrent rotation. The second operating clutch gear 42 includes an outer circumferential surface having a plurality of conventional splines provided thereon.

A second operating clutch collar 43 is supported on the second operating clutch gear 42 for rotation therewith. In the illustrated embodiment, the second operating clutch collar 43 includes an inner circumferential surface having a plurality of conventional splines provided thereon that continuously cooperate with the splines provided on the outer circumferential surface of the second operating clutch gear 42 and that selectively cooperate with the splines provided on the outer circumferential surface of the secondary gear portion 41a of the second operating gear 41. The second operating clutch collar 43 is axially slidable between a non-engaged position (not shown) and an engaged position (illustrated in FIGS. 2, 3, and 4). In the non-engaged position, the splines of the second operating clutch collar 43 engage only the splines of the second operating clutch gear 42 and do not engage the splines of the secondary gear portion 41a of the second operating gear 41. Thus, when the second operating clutch collar 43 is in the non-engaged position, the second operating shaft 40 is not rotatably driven by the input shaft 16. In the engaged position, the splines of the second operating clutch collar 43 engage both the splines of the second operating clutch gear 42 and the splines of the secondary gear portion 41a of the second operating gear 41. Thus, when the second operating clutch collar 43 is in the engaged position, the second operating shaft 40 is rotatably driven by the input shaft 16. Other power take-offs and/or accessories (not shown) described above may cooperate with the second operating shaft 40 so as to be rotatably driven thereby.

A conventional second shifter (not shown) may be provided for selectively moving the second operating clutch collar 43 between the non-engaged and engaged positions. Preferably, the second shifter that is provided for selectively moving the second operating clutch collar 43 between the non-engaged and engaged positions operates independently of the operation of the first shifter 23 described above, although such is not required. Thus, in each of the three modes of operation described above, the second operating shaft 40 can be rotatably driven by the input shaft 16 by means of the drive gear 20, the first operating gear 31, and the second operating gear 41 regardless of the operation of the shifter 23 described above.

Figure 6:
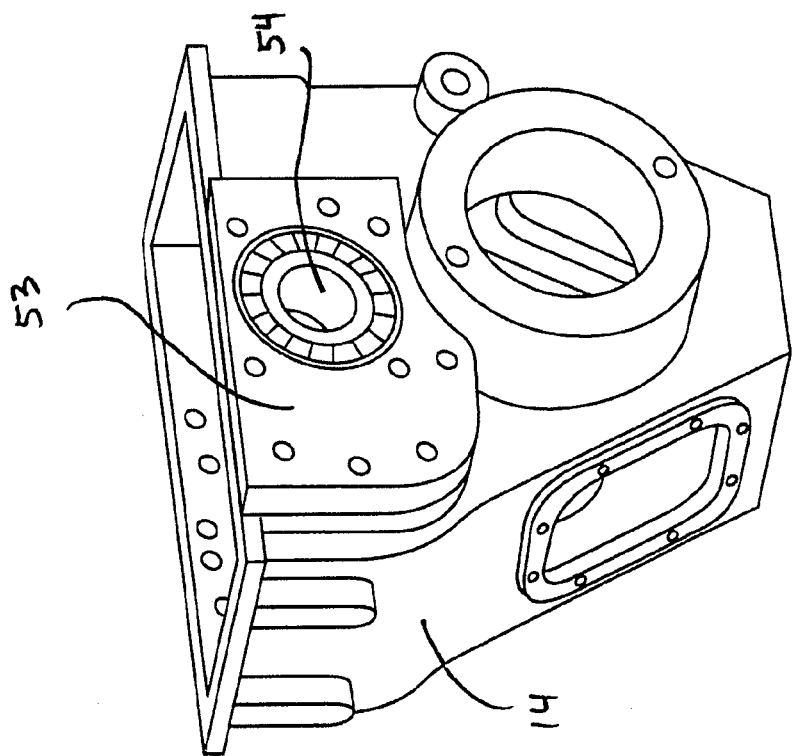
FIG. 6 is a perspective view of the rear end of the portions of the first housing portion, the bearing plate, and the annular bearing illustrated in FIG. 5 shown assembled.
Figure 5:
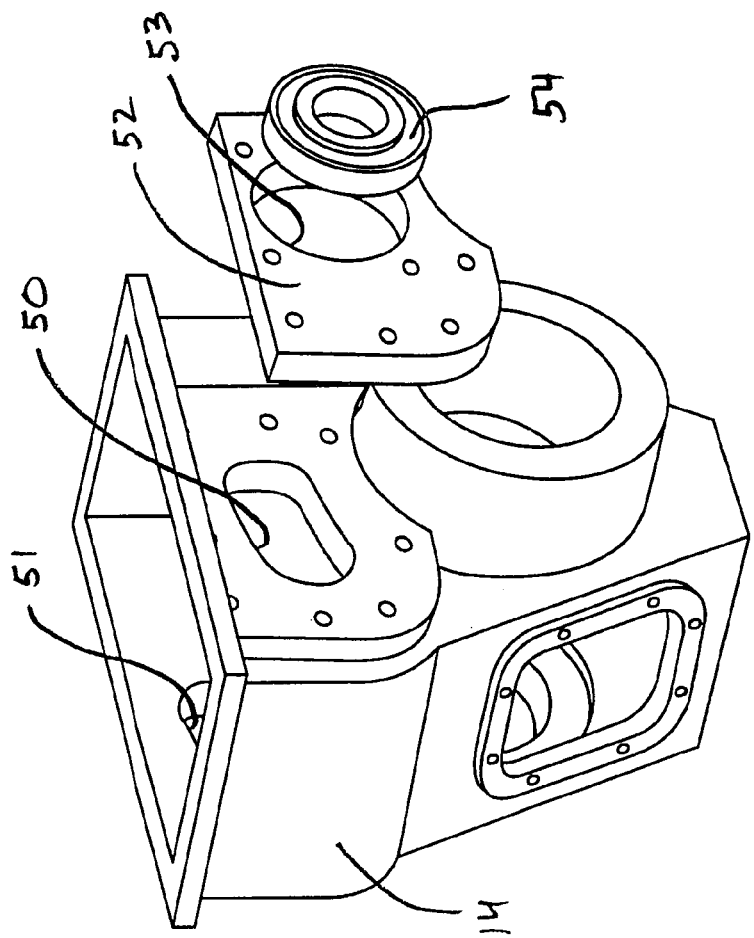
FIG. 5 is an exploded perspective view of the rear end of a first housing portion, a bearing support plate, and an annular bearing of the first embodiment of the split shaft transfer case illustrated in FIG. 1.

As mentioned above, the first operating shaft 30 is rotatably supported on the split shaft transfer case 12 in an adjustable manner. In the illustrated embodiment, the first operating shaft 30 is adjustably supported on the first housing portion 14 such that the axis of rotation thereof can be varied relative to the axes of rotation of the input shaft 16 and the second operating shaft 40. FIGS. 5 and 6 illustrate the first housing portion 14 of the split shaft transfer case illustrated in FIG. 1. As shown therein, the first housing portion 14 has first and second openings 50 and 51 formed through the forwardly and rearwardly facing ends thereof, respectively. In the illustrated embodiment, each of the first and second openings 50 and 51 is generally kidney-shaped, and the two openings 50 and 51 are aligned with one another in the fore-aft direction. Preferably, the first and second openings 50 and 51 are sized to permit the ends of the first operating shaft 30 to pass therethrough without contacting any part of the first housing portion 14. However, the first and second openings 50 and 51 may be formed having any desired shape or combination of shapes and may be provided at any desired locations on the first housing portion 14.

Respective bearing support plates 52 are secured to each of the forwardly and rearwardly facing ends of the first housing portion 14 of the split shaft transfer case 12. The bearing support plates 52 may be secured to the forwardly and rearwardly facing ends of the first housing portion 14 by threaded fasteners (not shown) or any other desired means. Each of the bearing support plates 52 has an opening 53 formed therethrough that is adapted to receive and support an associated conventional bearing 54 therein. When the bearing support plates 52 are secured to the forwardly and rearwardly facing ends of the first housing portion 14 and the bearings 54 are supported in the openings 53 formed through such bearing support plates 52, the bearings 54 are preferably co-axially aligned with one another. As a result, the bearings 54 define an axis of rotation that extends through the openings 50 and 51 respectively formed through the forwardly and rearwardly facing ends of the first housing portion 14. The bearings 54 are adapted to rotatably support the ends of the first operating shaft 30 on the associated bearing support plates 52 and, therefore, the first housing portion 14 of the split shaft transfer case 12.

Figure 9:
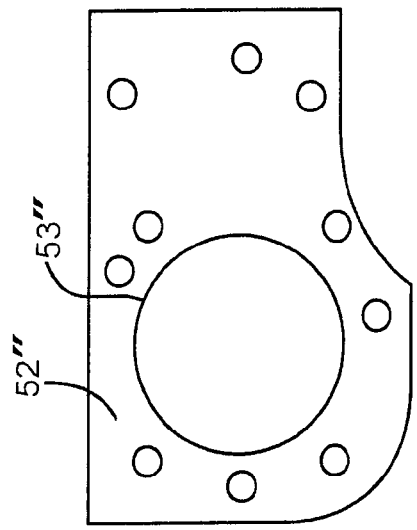
FIG. 9 is an end elevational view of a second alternative bearing support plate that can be used in lieu of the bearing support plate illustrated in FIGS. 5, 6, and 7.
Figure 8:
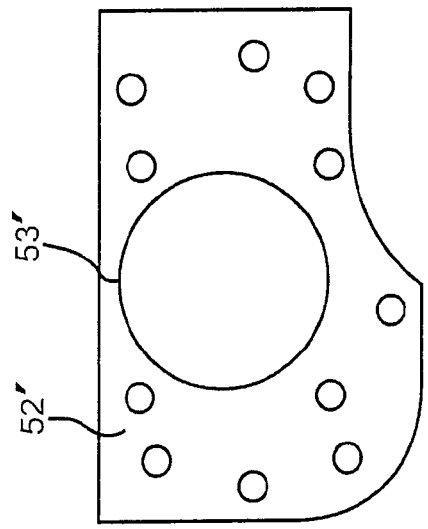
FIG. 8 is an end elevational view of a first alternative bearing support plate that can be used in lieu of the bearing support plate illustrated in FIGS. 5, 6, and 7.

Consequently, the location of the axis of rotation of the first operating shaft 30 relative to the axes of rotation of the input shaft 16 and the second operating shaft 40 is defined by the location of the bearings 54 provided in the openings 53 formed through the bearing plates 52 when supported on the first housing portion 14. FIGS. 8 and 9 respectively illustrate two alternative bearing support plates 52' and 52" that can be used in lieu of the bearing support plate 52 illustrated in FIGS. 5, 6, and 7. As shown therein, respective openings 53' and 53" formed through the alternative bearing support plates 52' and 52" are provided at different locations than the openings 53 formed through the bearing support plates 52 illustrated in FIGS. 5, 6, and 7. Thus, when either of the alternative bearing support plates 52' and 52" are secured to the forwardly and rearwardly facing ends of the first housing portion 14 and the bearings 54 are supported in the openings 53' and 53" respectively formed through such alternative bearing support plates 52' and 52", the axis of rotation of the first operating shaft 30 is located at a different position relative to the axes of rotation of the input shaft 16 and the second operating shaft 40.

Figure 7:
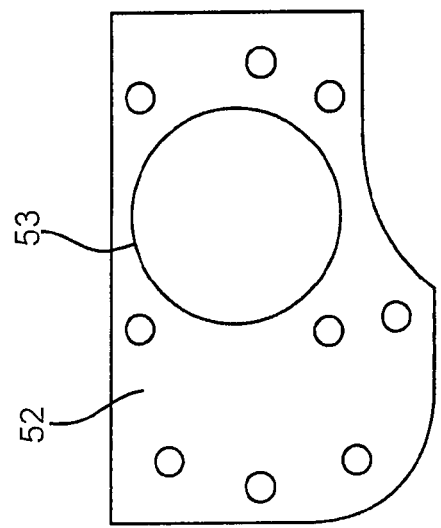
FIG. 7 is an end elevational view of the bearing support plate illustrated in FIGS. 5 and 6.

This adjustable positioning of the axis of rotation of the first operating shaft 30 relative to the axes of rotation of the input shaft 16 and the second operating shaft 40 is more clearly illustrated in FIGS. 10 through 15. As shown therein, a variety of configurations for the first embodiment of the split shaft transfer case 12 can be achieved using the different bearing support plates illustrated in FIGS. 7, 8, and 9. FIG. 10 illustrates a first configuration that is achieved when the bearing plates 52 illustrated in FIGS. 5, 6, and 7 are used to support the first operating shaft 30 (as represented by the first operating gear 31) on the first housing unit 14. In this first configuration, the axes of rotation of the input shaft 16 (as represented by the drive gear 20) and the first operating shaft 30 are laterally separated by a first distance D1. FIG. 11 illustrates a second configuration that is achieved when the bearing plates 52' illustrated in FIG. 8 are used to support the first operating shaft 30 on the first housing unit 14. In this second configuration, the axes of rotation of the input shaft 16 and the first operating shaft 30 are laterally separated by a second distance D2 that is greater than the first distance D1. Lastly, FIG. 12 illustrates a third configuration that is achieved when the bearing plates 52" illustrated in FIG. 9 are used to support the first operating shaft 30 on the first housing unit 14. In this third configuration, the axes of rotation of the input shaft 16 and the first operating shaft 30 are laterally separated by a third distance D3 that is greater than the second distance D2. In the second and third configurations, modified second operating gears 41' and 41" may be used in lieu of the second operating gear 41 used in the first configuration to accommodate the different locations of the axis of rotation of the first operating shaft 30 and to provide different gear ratios for the rotational speed of the second operating shaft 40 relative to the rotational speed of the input shaft 16. In each of the three configurations illustrated in FIGS. 10, 11, and 12, the first housing unit 14 and the second housing unit 15 are directly connected together. Thus, the axis of rotation of the second operating shaft 40 remains constant relative to the axis of rotation of the input shaft 16 even though the axis of rotation of the first operating shaft 30 is moved.

However, in some instances, it may be desirable to provide an even greater variety of gear ratios options for the rotational speed of the second operating shaft 40 relative to the rotational speed of the input shaft 16 or to re-position the axis of rotation of the second operating shaft 40 relative to the axis of rotation of the input shaft 16. This can be accomplished by providing a spacer between the first housing unit 14 and the second housing unit 15 of the split shaft transfer case 12, and shown in the configurations illustrated in FIGS. 13, 14, and 15. FIG. 13 illustrates a fourth configuration of the invention wherein both (1) the bearing plates 52 illustrated in FIG. 7 are used to support the first operating shaft 30 and (2) a first spacer 60 is provided between the first housing unit 14 and the second housing unit 15. The thickness of the first spacer 60 causes the axis of rotation of the second operating shaft 40 to be moved farther away from the axis of rotation of the input shaft 16 and the first operating shaft 30. To accommodate this, a differently sized second operating gear 42 is provided on the second operating shaft 40 in lieu of the second operating gear 41 described above. This also results in a further different gear ratio for the rotational speed of the second operating shaft 40 relative to the rotational speed of the input shaft 16.

Similarly, as shown in the fifth configuration illustrated in FIG. 14, the first spacer 60 can be provided between the first housing unit 14 and the second housing unit 15 when the alternative bearing plates 52' illustrated in FIG. 8 are used to support the first operating shaft 30. A further differently sized second operating gear 43 is provided on the power take-off shaft 40, which results in yet another different gear ratio for the rotational speed of the second operating shaft 40 relative to the rotational speed of the input shaft 16. Finally, as shown in the sixth configuration illustrated in FIG. 15, the first spacer 60 can be provided between the first housing unit 14 and the second housing unit 15 when the alternative bearing plates 52" illustrated in FIG. 9 are used to support the first operating shaft 30, resulting in the use of still another differently sized second operating gear 44 is provided on the second operating shaft 40 and yet another different gear ratio for the rotational speed of the second operating shaft 40 relative to the rotational speed of the input shaft 16. By using other spacers having different thicknesses, the axis of rotation of the second operating shaft 40 can be quickly and easily positioned relative to the axis of rotation of the input shaft 16. Also, a wide variety of different gear ratios for the rotational speed of the second operating shaft 40 relative to the rotational speed of the input shaft 16 can be quickly and easily achieved.

Thus, in addition to providing flexibility in the attainment of a variety of gear ratios, the use of the spacer 60 facilitates the installation and use of one or more driven devices in conjunction with the split shaft transfer case 12. For example, in some instances, the accessory 19 is supported on an external support surface, such as a frame of the vehicle, instead of being directly supported on the split shaft transfer case 12 as shown in FIG. 1. If the position of the second operating shaft 40 was not adjustable in the manner described above, then it would be necessary to move the accessory 19 into alignment with the axis of rotation of the second operating shaft 40. In some instances, it is relatively difficult to accomplish this. The use of the spacer 60 makes it relatively quick and easy to move the axis of rotation of the second operating shaft 40 into alignment with the accessory 19, thus facilitating the installation and use thereof.

Figure 16:
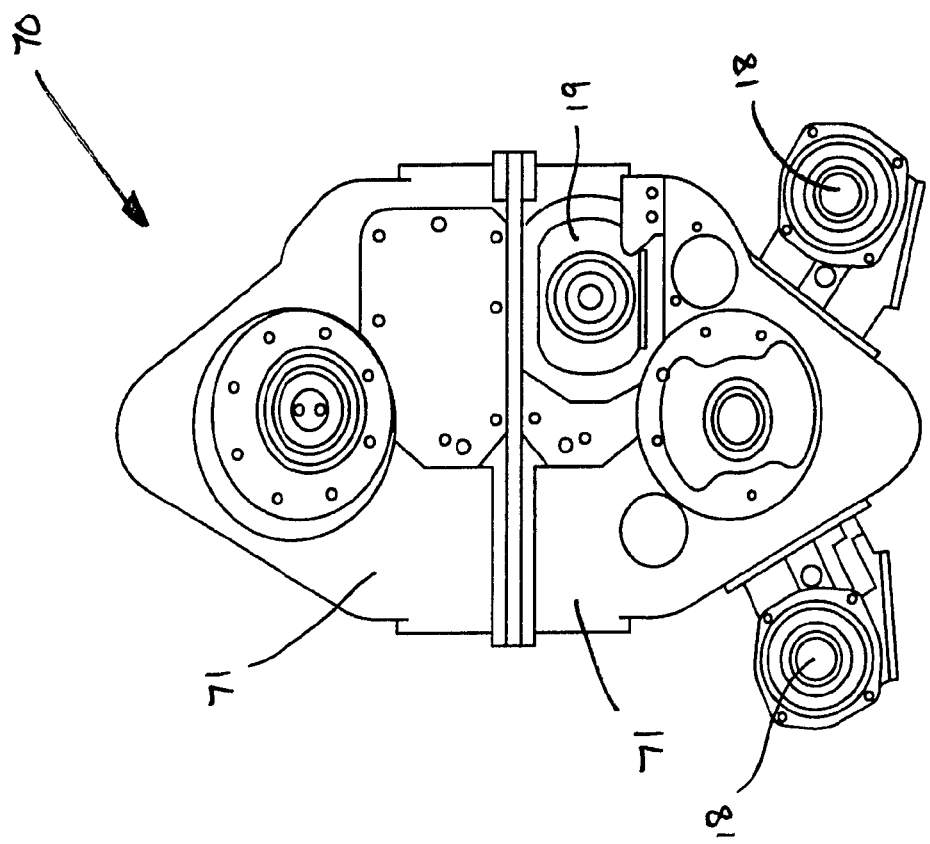
FIG. 16 is end elevational view of a second embodiment of a split shaft transfer case in accordance with this invention.

FIG. 16 illustrates a second embodiment of a split shaft transfer case, indicated generally at 70, in accordance with this invention. The second split shaft transfer case 70 is generally similar in structure and operation to the first split shaft transfer case 12 described above. However, instead of having a first housing portion 14 and a second housing portion 15 that are differently sized as shown in FIG. 1, the housing of the second split shaft transfer case 70 is composed of two identically shaped housing portions 71. Such a structure can reduce costs by minimizing the number of different parts needed to manufacture the second split shaft transfer case 70.

Figure 17:
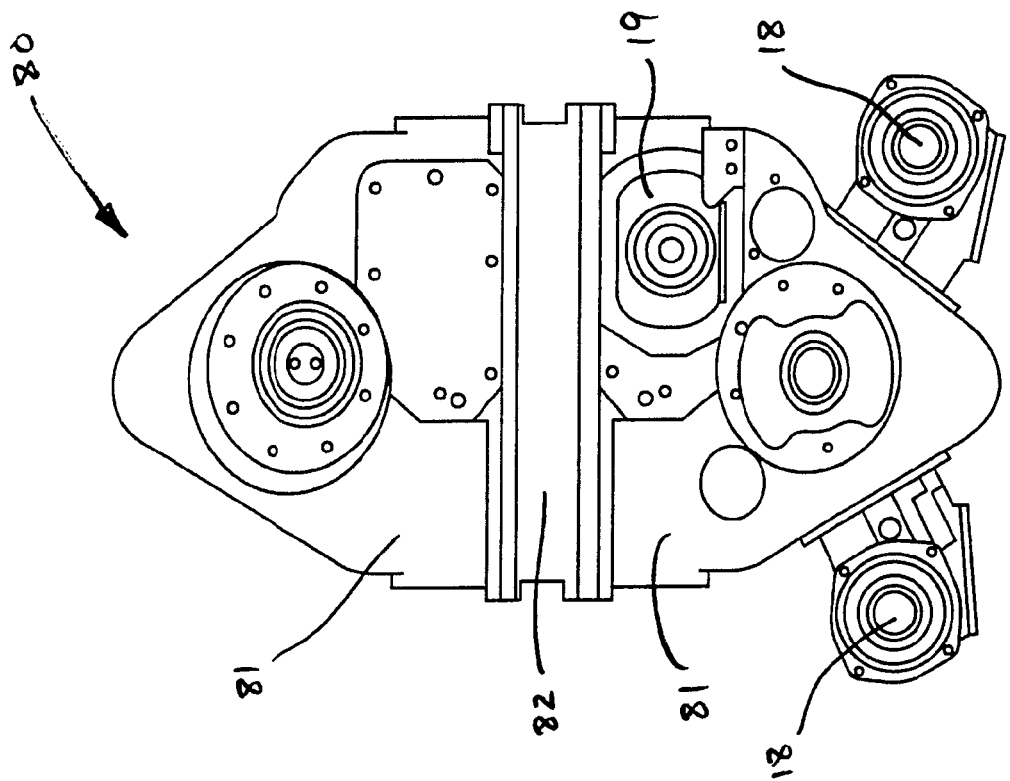
FIG. 17 is end elevational view of the second embodiment of a split shaft transfer case illustrated in FIG. 16 including a spacer.

FIG. 17 illustrates a second embodiment of a split shaft transfer case, indicated generally at 80, in accordance with this invention. The third split shaft transfer case 80 is generally similar in structure and operation to the second split shaft transfer case 70 described above. However, in additional to having two identically shaped housing portions 81, the housing of the third split shaft transfer case 80 has a spacer 82 provided therebetween. The spacer 82 may, if desired, rotatably support an idler gear (not shown) between the two housing portions 81. Such an intermediate idler gear can be used to reverse the direction of rotation of the operating shafts (not shown therein from the direction of rotation that would be achieved by the second split shaft transfer case 70.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A split shaft transfer case comprising:
   an enclosure;
   an input shaft and an output shaft that are supported on the enclosure for rotation about an axis of rotation;
   a drive clutch for selectively connecting the output shaft to the input shaft for rotation therewith;
   a first operating shaft that is supported on the enclosure for rotation about an axis of rotation; and
   a first operating clutch for selectively connecting the first operating shaft to the input shaft for rotation therewith;
   a second operating shaft that is supported on the enclosure for rotation about an axis of rotation; and
   a second operating clutch for selectively connecting the second operating shaft to the input shaft for rotation therewith, wherein the axis of rotation of at least one of the first and second operating shafts is movable relative to the axis of rotation of the input and output shafts.

2. The split shaft transfer case defined in claim 1 further including a structure for adjustably supporting the first operating shaft on the enclosure.

3. The split shaft transfer case defined in claim 2 wherein the structure for adjustably supporting the first operating shaft on the enclosure includes a pair of openings provided in the enclosure, a pair of bearing support plates supported on the enclosure and having respective openings provided therein that are aligned with the enclosure openings, and a pair of bearings supported in the bearing support plate openings and supporting the first operating shaft.

4. The split shaft transfer case defined in claim 1 further including a structure for adjustably supporting the second operating shaft on the enclosure.

5. The split shaft transfer case defined in claim 4 wherein the structure for adjustably supporting the second operating shaft on the enclosure includes a first housing portion, a second housing portion, and a spacer disposed between the first and second housing portion, wherein the first housing portion, the spacer, and the second housing portion are connected together to define the enclosure.

6. The split shaft transfer case defined in claim 1 further including a mechanism for selectively operating the split shaft transfer case one of: a first mode of operation, wherein the output shaft is not rotatably driven by the input shaft and the first operating shaft is rotatably driven by the input shaft; a second mode of operation, wherein the output shaft is not rotatably driven by the input shaft and the first operating shaft is not rotatably driven by the input shaft; and a third mode of operation, wherein the output shaft is rotatably driven by the input shaft and the first operating shaft is not rotatably driven by the input shaft.

7. The split shaft transfer case defined in claim 1 wherein the enclosure includes a first housing portion and a second housing portion that are secured together along a plane of engagement to form an enclosure; and wherein the input and output shafts defining respective axes of rotation that are generally parallel to the plane of engagement defined by the first and second housing portions.

8. A split shaft transfer case comprising:

an input shaft and an output shaft that are supported for rotation about an axis of rotation;

a first operating shaft that is supported for rotation about an axis of rotation; and a second operating shaft that is supported for rotation about an axis of rotation; and a mechanism for selectively operating the split shaft transfer case in each of:

a first mode of operation, wherein the output shaft is not rotatably driven by the input shaft and the first operating shaft is rotatably driven by the input shaft;

a second mode of operation, wherein the output shaft is not rotatably driven by the input shaft and the first operating shaft is not rotatably driven by the input shaft; and a third mode of operation, wherein the output shaft is rotatably driven by the input shaft and the first operating shaft is not rotatably driven by the input shaft.

9. The split shaft transfer case defined in claim 8 further including an actuator for selectively causing the output shaft to be rotatably driven by the input shaft.

10. The split shaft transfer case defined in claim 8 further including an actuator for selectively causing the first operating shaft to be rotatably driven by the input shaft.

11. The split shaft transfer case defined in claim 10 further including an actuator for selectively causing the output shaft to be rotatably driven by the input shaft and for selectively causing the first operating shaft to be rotatably driven by the input shaft.

12. The split shaft transfer case defined in claim 10 wherein the axis of rotation of at least one of the first and second operating shafts is movable relative to the axis of rotation of the input and output shafts.

13. The split shaft transfer case defined in claim 10 wherein the enclosure includes a first housing portion and a second housing portion that are secured together along a plane of engagement to form an enclosure; and wherein the input and output shafts defining respective axes of rotation that are generally parallel to the plane of engagement defined by the first and second housing portions.

* * * * *